(12) United States Patent
Gondek

(10) Patent No.: US 8,391,647 B1
(45) Date of Patent: Mar. 5, 2013

(54) PIXEL REPLACEMENT

(75) Inventor: Jay S. Gondek, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 504 days.

(21) Appl. No.: 12/706,848

(22) Filed: Feb. 17, 2010

(51) Int. Cl.
*G06K 9/32* (2006.01)

(52) U.S. Cl. ........ 382/298; 382/266; 382/260; 382/263; 382/192; 382/194; 382/300

(58) Field of Classification Search .................. 382/266, 382/298, 260, 263, 192, 194, 300
See application file for complete search history.

(56) References Cited

U.S. PATENT DOCUMENTS

| | | | |
|---|---|---|---|
| 4,466,702 A | 8/1984 | Wiener-Avnear et al. | |
| 4,532,650 A * | 7/1985 | Wihl et al. | 382/144 |
| 5,257,116 A * | 10/1993 | Suzuki | 358/465 |
| 5,270,728 A | 12/1993 | Lund et al. | |
| 5,394,485 A | 2/1995 | Lowe et al. | |
| 5,446,804 A | 8/1995 | Alleback et al. | |
| 5,583,953 A | 12/1996 | Harrington | |
| 5,844,627 A * | 12/1998 | May et al. | 348/607 |
| 5,867,606 A * | 2/1999 | Tretter | 382/261 |
| 5,966,474 A | 10/1999 | Vondran, Jr. | |
| 6,002,804 A | 12/1999 | Bhaskar et al. | |
| 6,075,926 A * | 6/2000 | Atkins et al. | 358/1.2 |
| 6,229,520 B1 * | 5/2001 | Clatanoff et al. | 345/611 |
| 6,229,578 B1 * | 5/2001 | Acharya et al. | 348/607 |
| 6,232,978 B1 | 5/2001 | Ishida et al. | |
| 6,285,798 B1 * | 9/2001 | Lee | 382/260 |
| 6,295,382 B1 * | 9/2001 | Karanovic | 382/261 |
| 6,427,031 B1 * | 7/2002 | Price | 382/264 |
| 6,556,711 B2 | 4/2003 | Koga et al. | |
| 6,724,945 B1 * | 4/2004 | Yen et al. | 382/274 |
| 6,870,644 B2 | 3/2005 | Schramm et al. | |
| 7,817,872 B2 * | 10/2010 | Michel et al. | 382/266 |
| 7,817,875 B2 * | 10/2010 | Michel et al. | 382/274 |
| 2004/0190787 A1 * | 9/2004 | Nakami | 382/260 |
| 2005/0135700 A1 * | 6/2005 | Anderson | 382/261 |
| 2006/0119897 A1 | 6/2006 | Morikawa | |
| 2006/0227353 A1 | 10/2006 | Morikawa | |
| 2009/0161992 A1 | 6/2009 | Taguchi et al. | |

FOREIGN PATENT DOCUMENTS

JP 08115416 * 5/1996

* cited by examiner

*Primary Examiner* — Jayesh A Patel

(74) *Attorney, Agent, or Firm* — Garry A. Perry

(57) ABSTRACT

In one embodiment, a plurality of target pixels within a digital representation of an image are selected, and a corner gradient pattern is determined for each of the target pixels. The corner gradient pattern is analyzed to classify the target pixel as an edge pixel or a non-edge pixel. If the target pixel is a non-edge pixel, target pixel is replaced with a plurality of non-edge output pixels. If the target pixel is an edge pixel, the target pixel is replaced with a plurality of edge output pixels, including determination of an orientation of an edge, and selection, based on the orientation, and application of a filter kernel to produce the edge output pixels to replace the target pixel.

16 Claims, 13 Drawing Sheets

112

114

PIXEL REPLACEMENT

BACKGROUND

Low resolution digital images can require significantly less memory for storage than high resolution digital images, and are thus well-suited for display and storage on computing devices with limited memory. Low resolution digital images can also be uploaded more quickly and are less likely to cause size-limitation errors than when using high resolution digital images, making them advantageous for sharing as attachments to emails and text messages, and for posting to photo-sharing and social-networking websites. For all these reasons, web sites that serve digital images frequently serve the digital images in a low resolution format.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

DETAILED DESCRIPTION OF EMBODIMENTS

The trend toward sharing digital images on computing devices and through social-networking websites creates an abundance of low-resolution photo content that may not look acceptable when printed. Embodiments described below were developed in an effort to replace pixels of a low resolution digital image, and thereby scale and enhance the low resolution digital image to create a high-quality, high resolution digital image suitable for printing.

The following description is broken into sections. The first, labeled "Environment", describes an example environment in which embodiments may be implemented. The second section, labeled "Components", describes various physical and logical components utilized to implement various embodiments. The third section, labeled as "Operation", describes various example embodiments of a method to scale a digital representation of an image. The fourth section, labeled "Example", describes examples of pixel replacement according to an embodiment.

Environment

Figure 1:
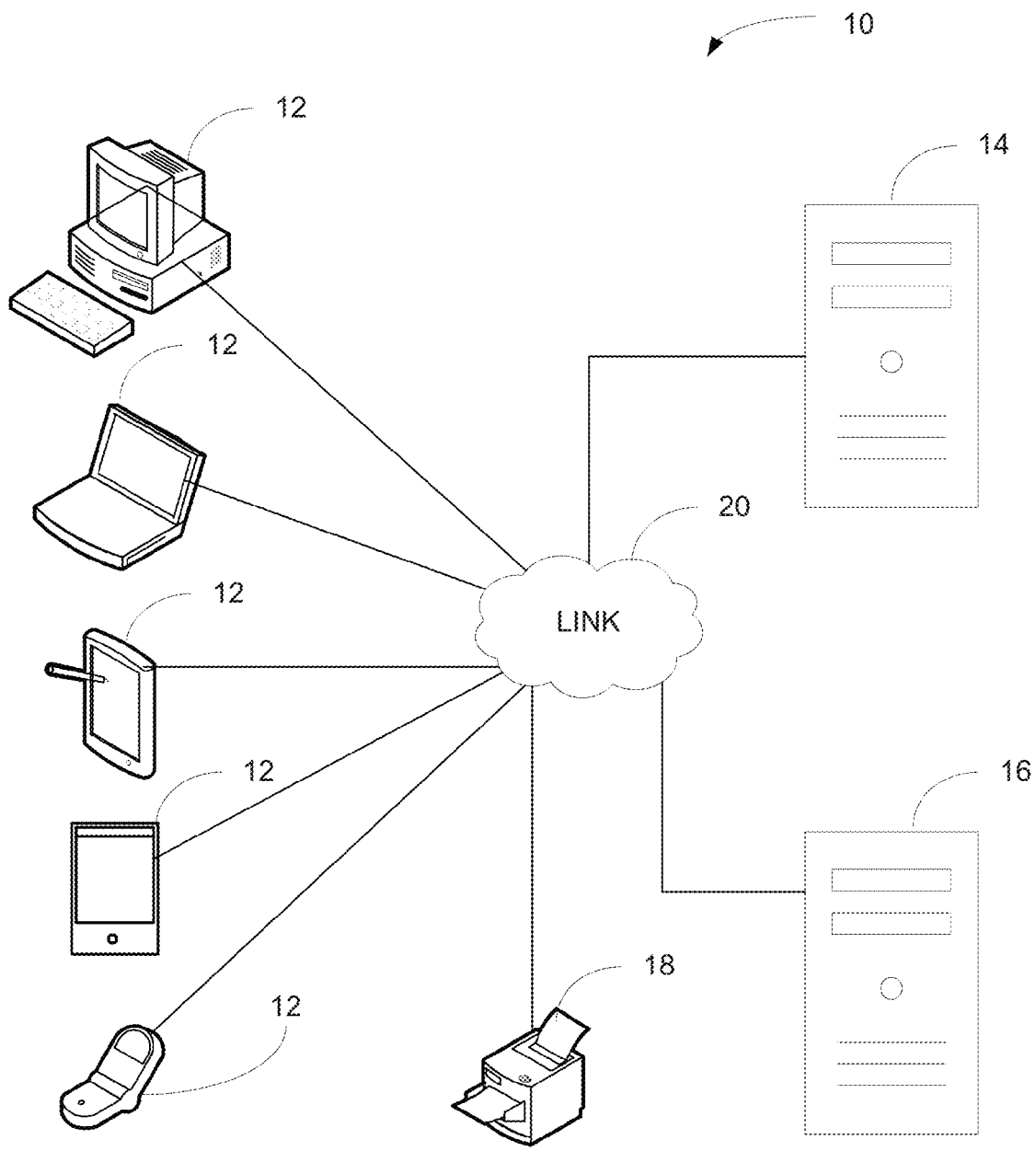
FIG. 1 depicts an example environment in which various embodiments may be implemented.

FIG. 1 depicts an example environment 10 in which various embodiments may be implemented. Environment 10 is shown to include computing devices 12, server 14, server 16, and printer 18. Computing devices 12 represent generally any computing device capable of storing and processing digital images. As used in this specification and the appended claims, "processing" includes executing instructions in memory to perform some transformation and/or computation on data in the computing device's memory. Examples include desktop computers, laptop computers, digital tablet computers, smart phones, cell phones, personal digital assistants, net-books, digital media players, and the like.

Each of server 14 and server 16 represent computing devices capable of receiving and responding to network requests from computing device 12. As discussed with reference to FIGS. 2-6 below, server 14 may be a web site designed to serve requested content to computing device 12. Server 16 may be a print site configured to receive print requests from computing device 12, and in response cause printer 18 to produce printed output. Printer 18 represents generally any device configured to produce printed output at the direction of one of a server 14, server 16 and computing device 12.

Devices 12, 14, 16, and 18 are interconnected via link 20. Link 20 represents generally one, or a combination, of a cable, wireless, fiber optic, or remote connection via a telecommunication link, an infrared link, a radio frequency link, or any other connector or system that provides electronic communication. Link 20 may represent an intranet, the internet, or a combination of both. The paths followed by link 20 between devices 12, 14, 16, and 18 as depicted in FIG. 1 represent the logical communication paths between these devices, not necessarily the physical paths between the devices.

Components

Figure 2:
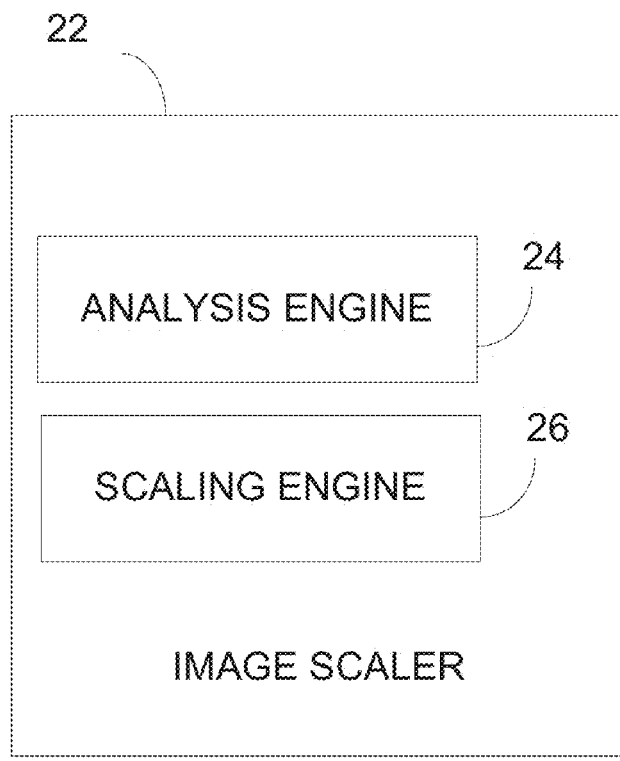
FIG. 2 depicts an example of an image scaler according to an embodiment.

FIG. 2 depicts an example of an image scaler 22. Image scaler 22 represents generally any combination of hardware and programming configured for use to convert a digital representation of a digital image to a higher resolution digital representation of the digital image. As used in this specification and the appended claims, "digital representation of an image" and "digital image" are used synonymously, and include a representation of an analog image converted to numerical form so that it can stored and used in computing devices, servers, printers and other machines capable of performing calculations and manipulating data. In the example of FIG. 2, image scaler 22 is shown to include an analysis engine 24 and a scaling engine 26.

Analysis engine 24 represents generally any combination of hardware and programming configured to select a plurality of target pixels within a digital representation of a digital image, and, for each of the target pixels, determine a corner gradient pattern. As used in this specification and the appended claims, a "pixel" includes a discrete unit of a digitally quantized image attribute, such as brightness, luminance or color, which unit may be combined with other discrete units to construct a digital image. As used in this specification and the appended claims, a "gradient pattern" includes a pattern of changes in the magnitude in values of pixels that represent an image attribute, such as brightness, luminance or color. As used in this specification and the appended claims, "values", "values of pixels that represent an image attribute" and "attribute values" are used synonymously. As used in this specification and the appended claims, a "corner gradient pattern" includes gradients calculated at the corners of a pixel. Such corner gradient patterns may be determined by analyzing windows of pixels of different sizes, for example a 2×2 gradient operator (a 2×2 pixel matrix or window containing four pixels) or a 3×3 gradient operator (a 3×3 matrix or window containing nine pixels). For each of the target pixels, the analysis engine 24 analyzes its corner gradient pattern to classify the target pixel as an edge pixel or a non-edge pixel.

Scaling engine 26 represents generally any combination of hardware and programming configured to, if the target pixel is a non-edge pixel, replace the target pixel with a plurality of non-edge output pixels. The scaling engine 26 is additionally configured to, if the target pixel is an edge pixel, replace the target pixel with a first plurality of edge output pixels, the replacing including determining an orientation of an edge, and selecting, based on the orientation, and applying a filter kernel to produce the edge output pixels to replace the target pixel. As used in this specification and the appended claims, "applying a filter kernel" includes applying a matrix to a pixel region surrounding a target pixel, the matrix containing multiplication factors to be applied to the target pixel. By choosing different filter kernels, different types of filtering can be applied that are consistent with the orientation of the edge. In an embodiment, the scaling engine 26 is configured to apply a 3×3 filter kernel to produce the edge output pixels to replace the target pixel. In an embodiment, the scaling engine 26 is configured to select four 3×3 filter kernels to produce four edge output pixels to replace the target pixel.

In an embodiment, the scaling engine 26 is configured to calculate four corner gradients, one at each of four corners of a target pixel, to determine a corner gradient pattern. In an embodiment, the scaling engine 26 is configured to determine an orientation of an edge by reducing four corner gradients to an aggregate gradient. The scaling engine 26 may be configured to analyze the four corner gradients to create four vectors within a coordinate system with four quadrants, to project any vectors in a first quadrant to an opposite facing second quadrant, to project any vectors in a third quadrant to an opposite facing fourth quadrant, to sum second quadrant vectors to create a summed second quadrant vector, to sum fourth quadrant vectors to create a summed fourth quadrant vector, to compare magnitudes of the summed second quadrant vector and the summed fourth quadrant vector to determine a greatest magnitude vector, and to assign the greatest magnitude vector as the aggregate gradient. As used in this specification and the appended claims, the designations of first, second, third and fourth quadrants are not meant to correlate with or be limited by any conventions in naming quadrants in a Cartesian coordinate system. That is, "a first quadrant" described in this paragraph could be any of four quadrants in the coordinate system, and is not limited to the top right quadrant sometimes referred to by convention as "quadrant one". The same is true for the second, third and fourth quadrants described in this paragraph. In an embodiment, quadrants that are opposite facing are cater-corner to one another. In an embodiment, quadrants that are opposite facing are adjacent to each other and not cater-corner.

In an embodiment, the scaling engine 26 is additionally configured to range limit a second plurality of edge output pixels. The scaling engine 26 may be configured to accomplish range limiting by, for each of the second plurality of edge output pixels, comparing the edge output pixel to the target pixel and a plurality of neighbor pixels, and if the value of the edge output pixel lies outside a range value of the target pixel and the neighbor pixels, the value of the edge output pixel is set to the range value. As used in this specification and the appended claims, "neighbor pixels" include pixels within a defined proximity of a target pixel. In an example, neighbor pixels may be pixels that are located within a 5×5 matrix of pixels surrounding a target pixel.

Figure 3:
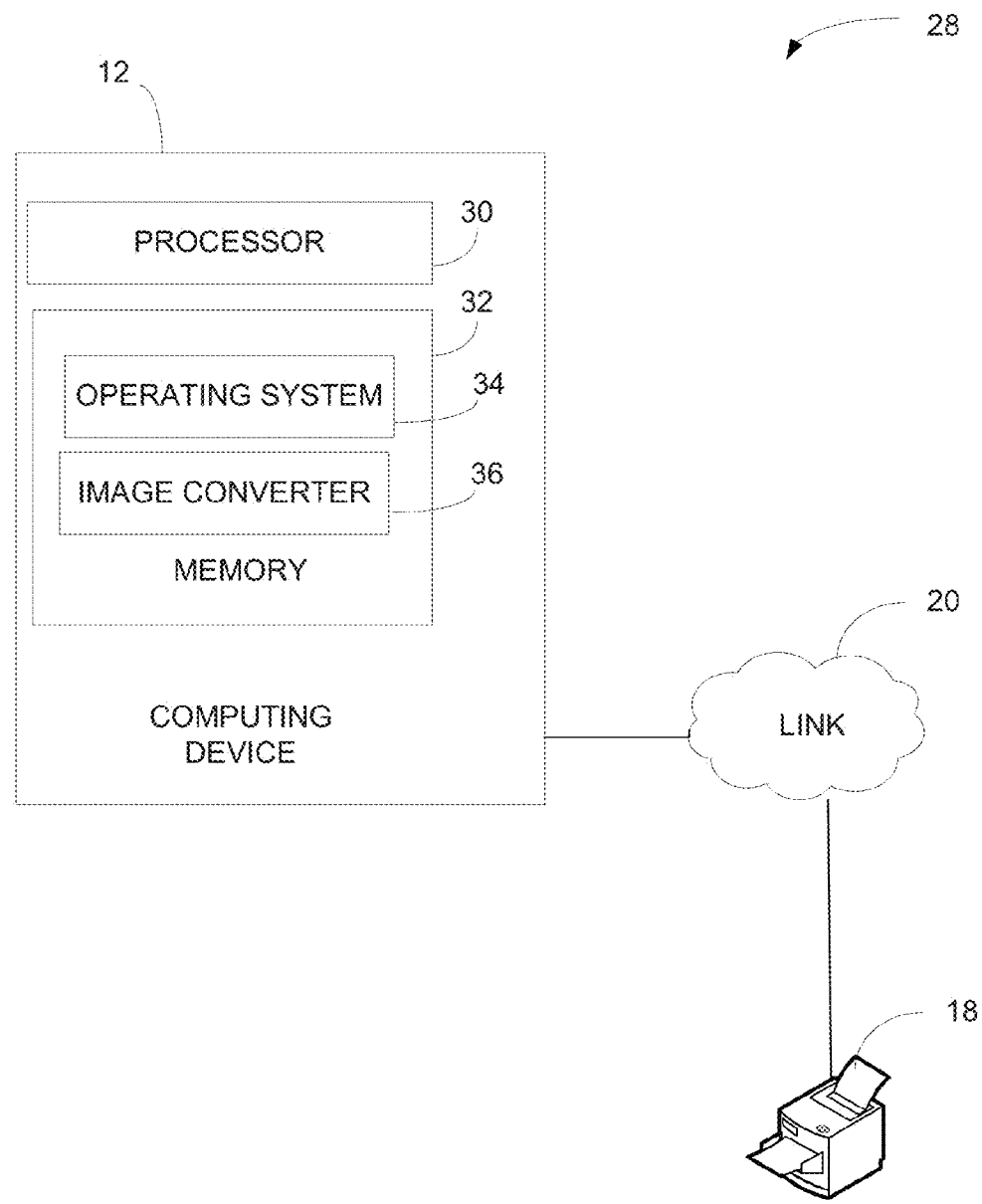
FIGS. 3-6 depict implementations of the imager scaler of FIG. 2 according to various embodiments.

Image scaler 22 may be implemented in a number of environments, such as environment 28 of FIG. 3. Environment 28 includes a computing device 12 a link 20, and a printer 18. In an embodiment, computing device 12 may be a laptop computer and is shown to include a processor 30 and memory 32. Processor 30 represents generally any device capable of executing program instructions stored in memory 32. Memory 32 represents generally any memory configured to store program instructions and other data. Memory 32 is shown to include operating system 34, and image converter 36. Operating system 34 represents generally any software platform on top of which other programs or applications such as the image converter 36 run.

Image converter 36 represents generally any programming that, when executed, implements the functionality of the image scaler 22 of FIG. 2. In particular, image converter 36, when executed by processor 30, is responsible for selecting a plurality of target pixels within a digital representation of a digital image, and, for each of the target pixels, determining a corner gradient pattern. For each of the target pixels, the image converter 36 analyzes a corner gradient pattern to classify the target pixel as an edge pixel or a non-edge pixel. If the target pixel is a non-edge pixel, the image converter 36 replaces the target pixel with a plurality of non-edge output pixels. The image converter 36 is additionally configured to, if the target pixel is an edge pixel, replace the target pixel with a first plurality of edge output pixels, the replacing including determining an orientation of an edge, and selecting, based on the orientation, and applying a filter kernel to produce the edge output pixels to replace the target pixel. In an embodiment, the image converter 36 is additionally configured to range limit a second plurality of edge output pixels in order that attribute values of the edge output pixels do not exceed the range of values of a set of comparison pixels.

Printer 18 represents generally any combination of hardware and programming capable of receiving a print job that includes a digital image from the computing device 12, directly or indirectly via link 20, and producing the digital image as printed output on a print medium.

Figure 4:
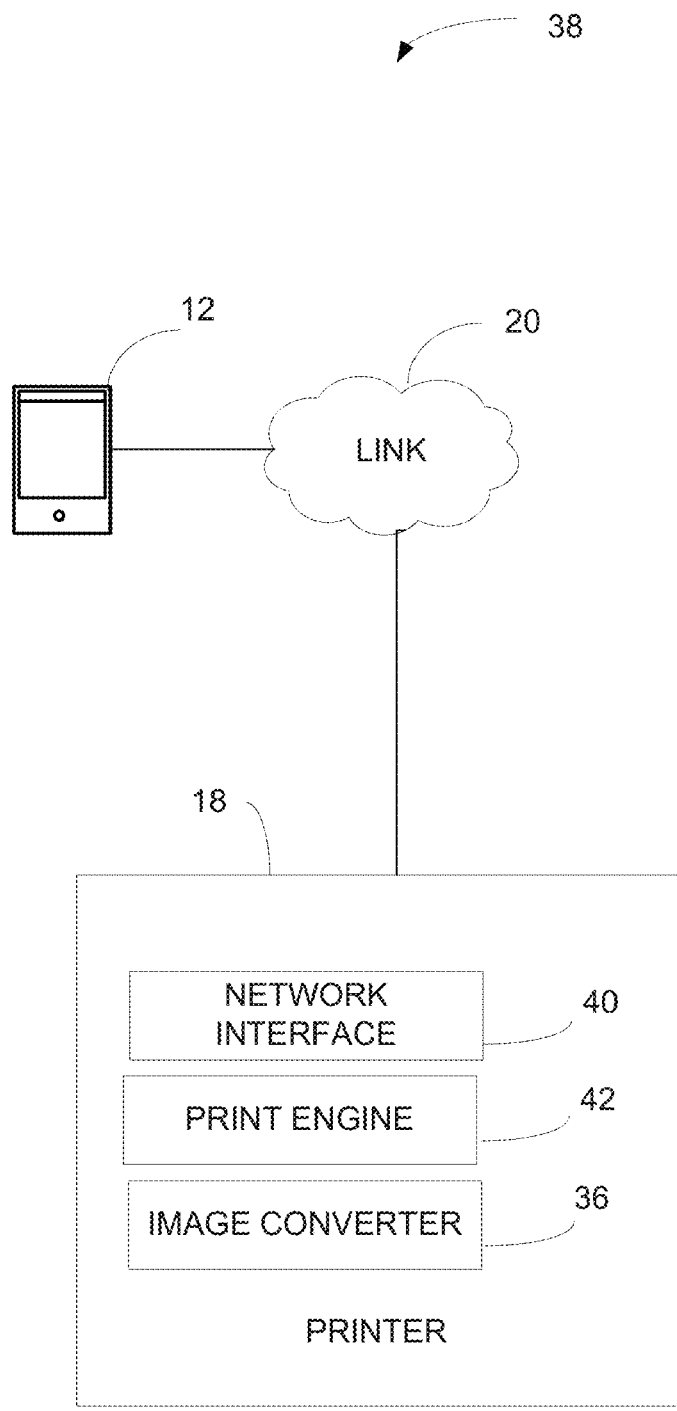

Moving to FIG. 4, an implementation is depicted in which some of the actions that were taken by computing device 12 in FIG. 3 are now taken by printer 18. In particular, computing device 12 may send a print job that contains a low resolution digital image, directly or indirectly via link 20, to printer 18, and an image converter 36 residing on the printer 18 may scale the digital image prior to printing.

Environment 38 includes a computing device 12, a link 20, a server 14 and a printer 18. In an embodiment, computing device 12 may be a smart phone computing device, with Bluetooth©, wireless and/or wired connectivity to server 14 and/or printer 18 via link 20. In an embodiment, printer 18 may be a web-enabled printer server and may include a network interface 40, a print engine 42 and an image converter 36. Network interface 40 represents generally any combination of hardware and programming capable of receiving print jobs, directly or indirectly via the link 20, from the computing device 12. Print engine 42 represents generally any combination of hardware and programming capable of producing printed output from print jobs received from the computing device 12. In particular, print engine 42 utilizes imaging material such as ink or toner to form a desired digital image on a print medium. Image converter 36 represents generally any programming that, when executed, implements the functionality of the image scaler 22 of FIG. 2.

Figure 5:
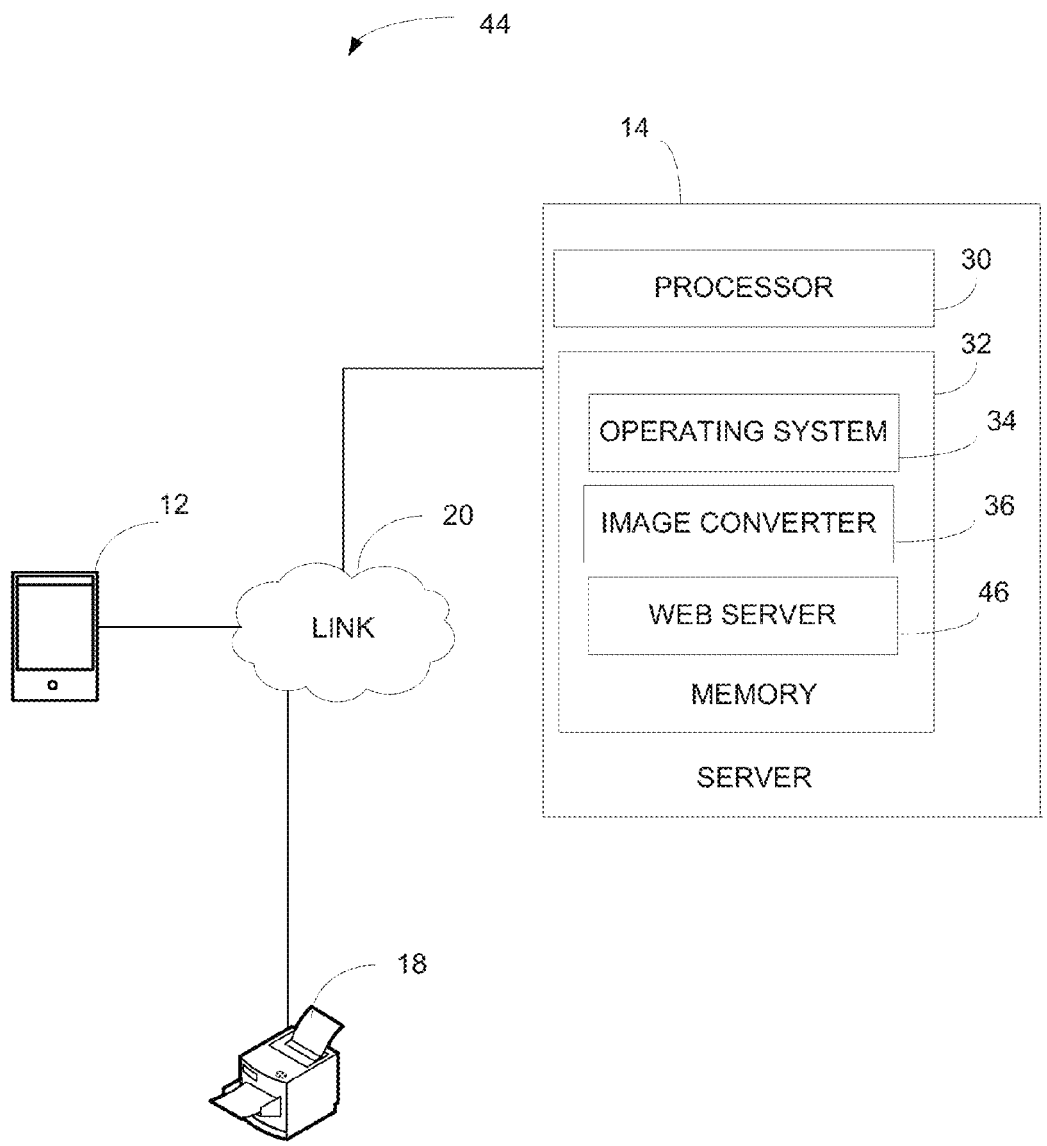

Moving to FIG. 5, an implementation is depicted in which some of the actions taken by computing device 12 in FIG. 3, and the printer 18 in FIG. 4, are now taken by a server 14. In particular, computing device 12 may communicate a request for digital image content to server 14, and server 14, designed to serve digital content, may provide digital image content to the computing device 12 or printer 18 in low resolution format for viewing. The server 14 may also serve to computing device 12 or printer 18 a high resolution version of digital content upon request or when the server 14 detects that a high resolution version would be preferable for printing or other applications.

Environment 44 includes a computing device 12, a link 20, a server 14 and a printer 18. In an embodiment, computing device 12 may be a smart phone with internet, Bluetooth©, wireless and/or wired connectivity to printer 18 and server 14 via link 20. In an embodiment, server 14 is shown to include a processor 30 and memory 32. Processor 30 represents generally any device capable of executing program instructions stored in memory 32. Memory 32 represents generally any memory configured to store program instructions and other data. Memory 32 is shown to include operating system 34, a web server 46, and an image converter 36. Operating system 34 represents generally any software platform on top of which other programs or applications such as the web server 46 and image converter 36 run. Web server 46 represents generally any programming that, when executed, stores, delivers and receives web pages, documents, digital images and other content to and from computing devices via the internet. Image converter 36 represents generally any programming that, when executed, implements the functionality of the image scaler 22 of FIG. 2. Printer 18 represents generally any combination of hardware and programming capable of receiving a print job that includes a digital image from the computing device 12, directly or indirectly via link 20, and producing the digital image as printed output on a print medium.

Figure 6:
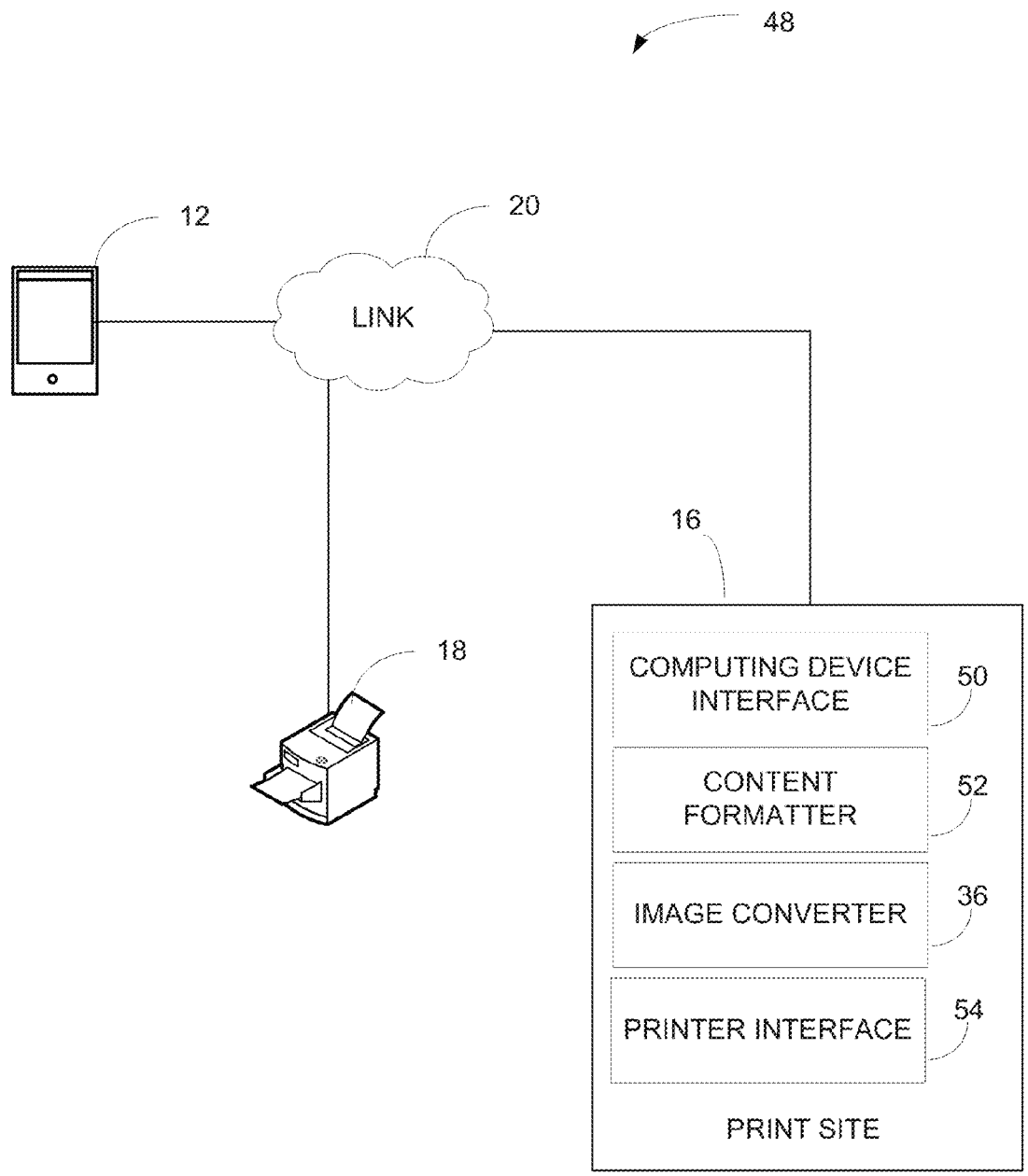

Moving to FIG. 6, an implementation is depicted in which some of the actions taken by computing device 12 in FIG. 3, by a printer 18 in FIG. 4, and a server 14 in FIG. 5 are now taken by a print site 16. In particular, computing device 12 may communicate print requests that include low resolution digital images to a print site 16 via a link 20, and an image converter 36 residing on a print sit server may convert the low resolution digital image to a high resolution digital image suitable for printing.

Environment 48 includes a computing device 12, a link 20, a print site server 16 and a printer 18. In an embodiment computing device 12 may be a cell phone with Bluetooth©, internet, wireless or wired connectivity to printer 18 via the link 20, and internet connection to the print site server 16 via the link 20. In an embodiment, print site 16 is shown to include a computing device interface 50, a content formatter 52, an image converter 36 and a printer interface 54. Computing device interface 50 represents generally any combination of hardware and programming capable of receiving a digital image and/or a print job from a computing device 12. Content formatter 52 represents generally any combination of hardware and programming configured to format received content for printing. Such may include formatting the content, as-is, into a format compatible for printing by printer 18. Example formats include Post Script, PDL (Page Description Language), and PDF (Portable Document Format). Image converter 36 represents generally any programming that, when executed, implements the functionality of the image scaler 22 of FIG. 2. Printer interface 54 represents generally a combination of hardware and programming capable communicating a print job for the formatted content to printer 18. Printer interface 54 may be responsible for receiving communications from printer 18 and then using computing device interface 50 to route the communications back to computing device 12. Such communications may include an indication that the print job was received, the print job has been printed, any error messages, and any other information related to the print job. Printer 18 represents generally any combination of hardware and programming capable of receiving a print job that includes a digital image from the print site 16 and producing the digital image as printed output on a print medium.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Operation

Figure 7:
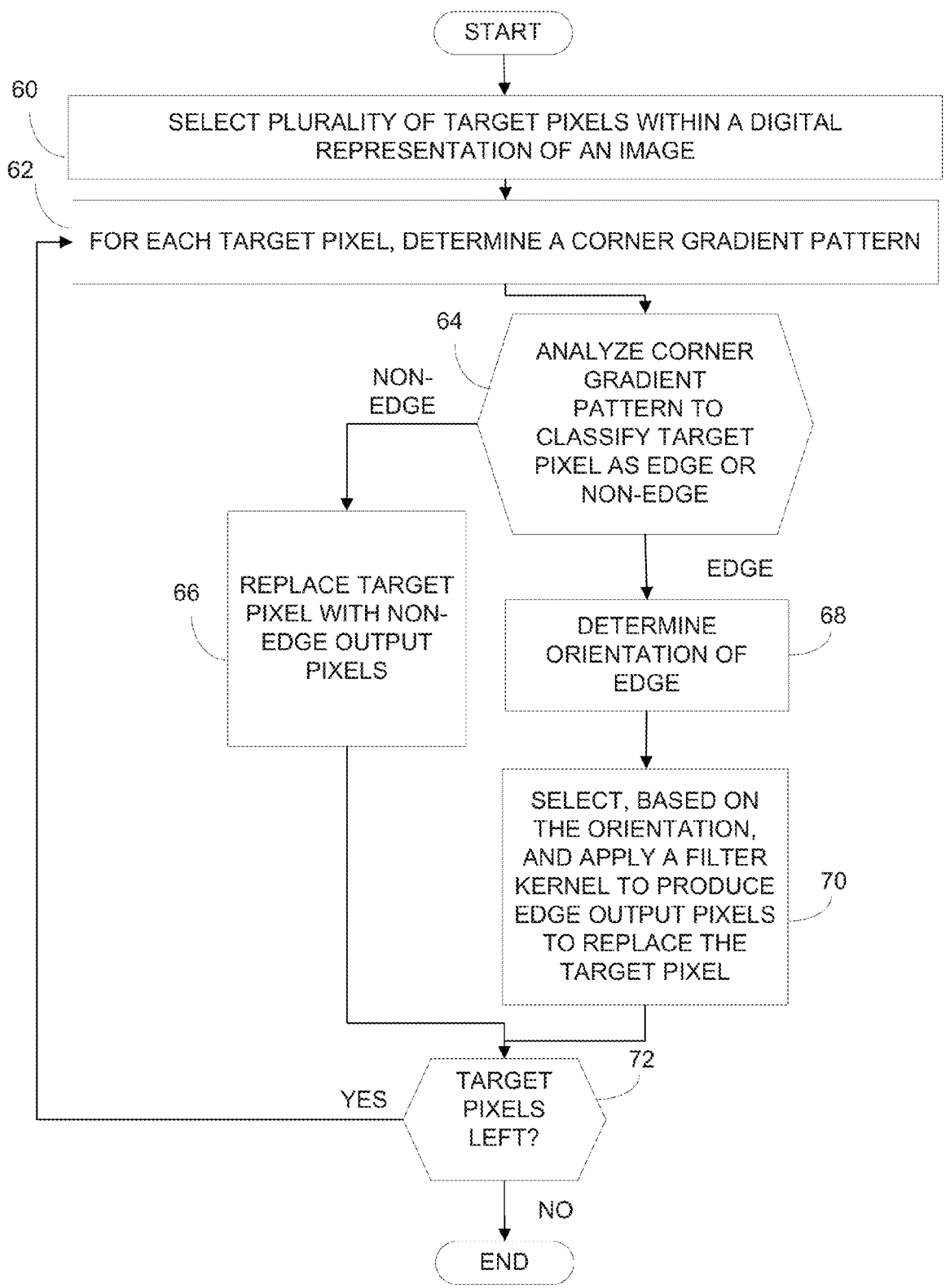
FIGS. 7-8 are example flow diagrams depicting embodiments of a method to scale a digital representation of an image.
Figure 8:
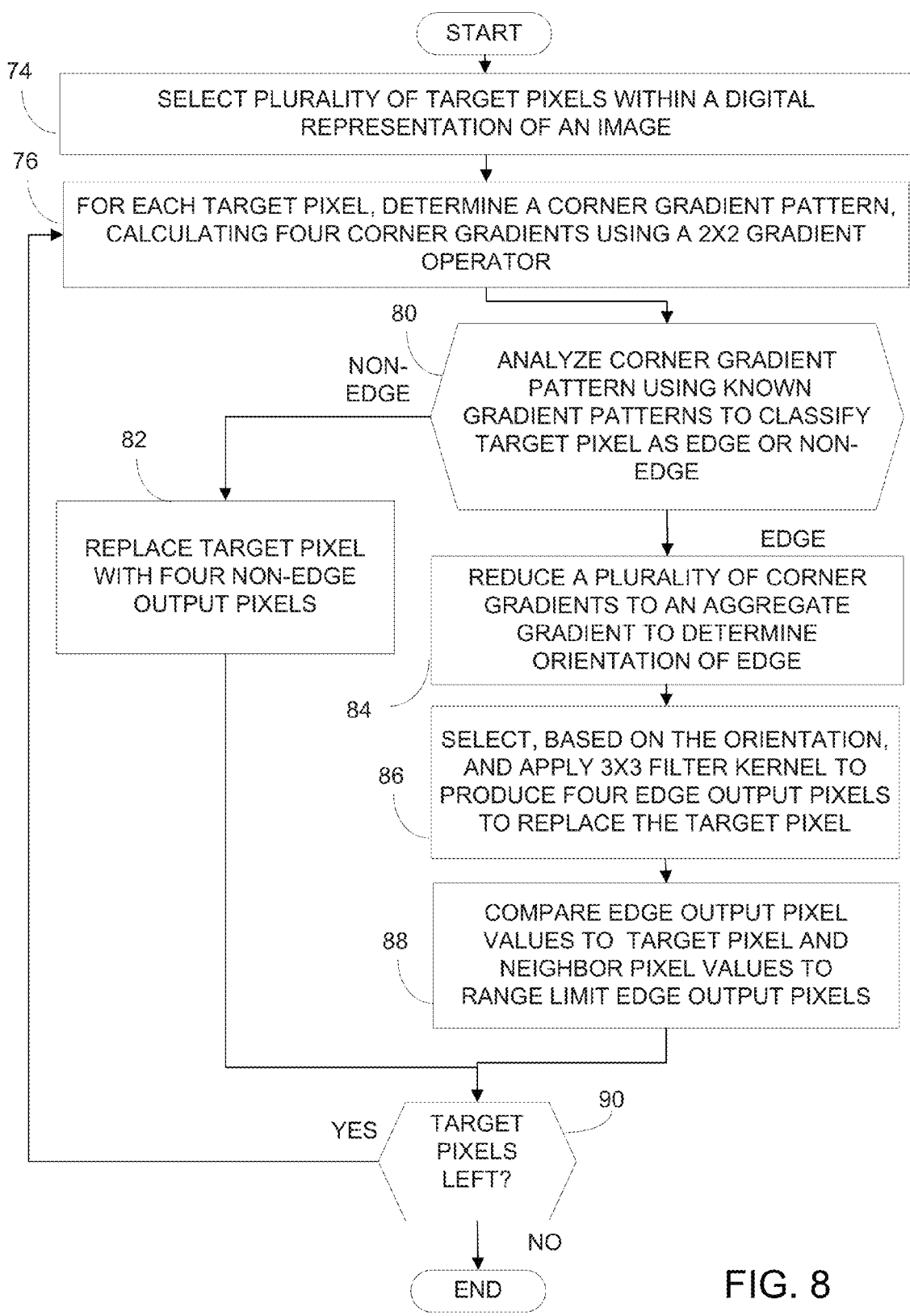

FIGS. 7 and 8 are example flow diagrams depicting example embodiments of a method to scale a digital representation of an image. In discussing FIGS. 7 and 8, reference may be made to the diagrams of FIGS. 1-6 to provide contextual examples. Implementation, however, is not limited to those examples.

Starting with FIG. 7, a plurality of target pixels within a digital representation of a digital image are selected (block 60). Referring back to FIG. 2, the analysis engine 24 may be responsible for implementing block 60. In an embodiment, all pixels within the digital image are selected as target pixels. In another embodiment, a subset of all pixels in the digital image are selected as target pixels, for example, all pixels except border pixels.

Continuing with the flow diagram of FIG. 7, for each target pixel a corner gradient pattern is determined (block 62). The corner gradient pattern is analyzed to classify the target pixel as an edge or a non-edge pixel (block 64). Referring back to FIG. 2, the analysis engine 24 may be responsible for implementing blocks 62 and 64.

Continuing with the flow diagram of FIG. 7, if the target pixel is classified as a non-edge pixel, the target pixel is replaced with a plurality of non-edge output pixels (block 66). Referring back to FIG. 2, the scaling engine 26 may be responsible for implementing block 66.

Continuing with the flow diagram of FIG. 8, if the target pixel is classified as an edge pixel, the target pixel is replaced with a first plurality of edge output pixels. An orientation of an edge that the target pixel is a part of is determined (block 68). In an embodiment, determining an orientation of an edge is accomplished by applying a rule that gradients on opposite sides of the target pixel pointing in approximately a common direction identify the target pixel as a member of an edge perpendicular to the common direction. In an embodiment, determining an orientation of an edge is accomplished by applying a rule that gradients on opposite sides of a target pixel pointing in approximately opposite directions identify the target pixel as a member of a fine line.

Based on the determined orientation, a filter kernel is selected and applied to produce edge output pixels that replace the target pixel (block 70). Referring back to FIG. 2, the scaling engine 26 may be responsible for implementing blocks 68 and 70.

If all pixels within the plurality of target pixels that were selected to be scaled have been analyzed and replaced with either non-edge output pixels or edge output pixels, the method ends. Otherwise, the actions described in blocks 62-72 are repeated for each target pixel until each target pixel has been analyzed and replaced with a non-edge or edge output pixel (block 72).

Moving on to FIG. 8, in a particular implementation, a plurality of target pixels within a digital representation of a digital image are selected (block 74). For each target pixel a corner gradient pattern is determined by calculating four corner gradients using a 2×2 gradient operator (block 76). The corner gradient pattern is analyzed using a set of known gradient patterns, and the target pixel is then classified as an edge pixel or a non-edge pixel (block 80). Referring back to FIG. 4, the analysis engine 24 may be responsible for implementing blocks 74, 76 and 80.

Continuing with the flow diagram of FIG. 8, if the target pixel is classified as a non-edge pixel, the target pixel is replaced with four non-edge output pixels (block 82). Referring back to FIG. 2, the scaling engine 26 may be responsible for implementing block 82.

Continuing with the flow diagram of FIG. 8, if the target pixel is classified as an edge pixel, a plurality of corner gradients are reduced to an aggregate gradient to determine the orientation of the edge that the target pixel is a part of (block 84). Referring back to FIG. 2, the scaling engine 26 may be responsible for implementing block 84. In an embodiment, four corner gradients are reduced to an aggregate gradient. In an embodiment, reducing the four corner gradients to an aggregate gradient includes analyzing the four corner gradients to create vectors within a four quadrant coordinate system, with each of the vectors appearing in not more than one quadrant. Any vectors in a first quadrant are projected to an opposite facing second quadrant. Any vectors in a third quadrant are projected to an opposite facing fourth quadrant. Any second quadrant vectors (original vectors and projected vectors) are summed to create a summed second quadrant vector. Any fourth quadrant vectors (original vectors and projected vectors) are summed to create a summed fourth quadrant vector. The magnitudes of the summed second quadrant vector and the summed fourth quadrant vector are compared to determine a greatest magnitude vector, and the greatest magnitude vector is assigned as the aggregate gradient. For purposes of this specification and the appended claims, points of a vector that lie directly upon an x axis or y axis in a Cartesian coordinate system are not construed as occupying more than one quadrant.

Continuing with the flow diagram of FIG. 8, based on the orientation that was determined in block 84, a 3×3 filter kernel is selected and applied to produce four edge output pixels that replace the target pixel (block 86). Referring back to FIG. 2, the scaling engine 26 may be responsible for implementing block 86. In embodiments, one, two, three or four 3×3 filters may used to produce each of four edge output pixels to replace the target pixel.

Continuing with the flow diagram of FIG. 8, a plurality of edge output pixels are range limited to adjust attribute values that are outside the range of neighbor pixels. Each of the edge output pixels to be range limited is compared to the target pixel that the edge output pixels originated from, and to neighbor pixels. In an example, neighbor pixels may be pixels that are located within a 3×3 matrix of pixels surrounding a target pixel. If the value of the edge output pixel lies outside a range value of the target pixel and the neighbor pixels, the value of the edge output pixel is set to the range value. Referring back to FIG. 2, the scaling engine 26 may be responsible for implementing block 88.

In an embodiment, if all target pixels that were selected to be scaled have been analyzed and replaced with either non-edge output pixels or edge output pixels, the method ends. Otherwise, the actions described in blocks 76-90 are repeated for each target pixel until all target pixels have been analyzed and replaced with a non-edge or edge output pixel (block 90).

Examples

Figure 9:
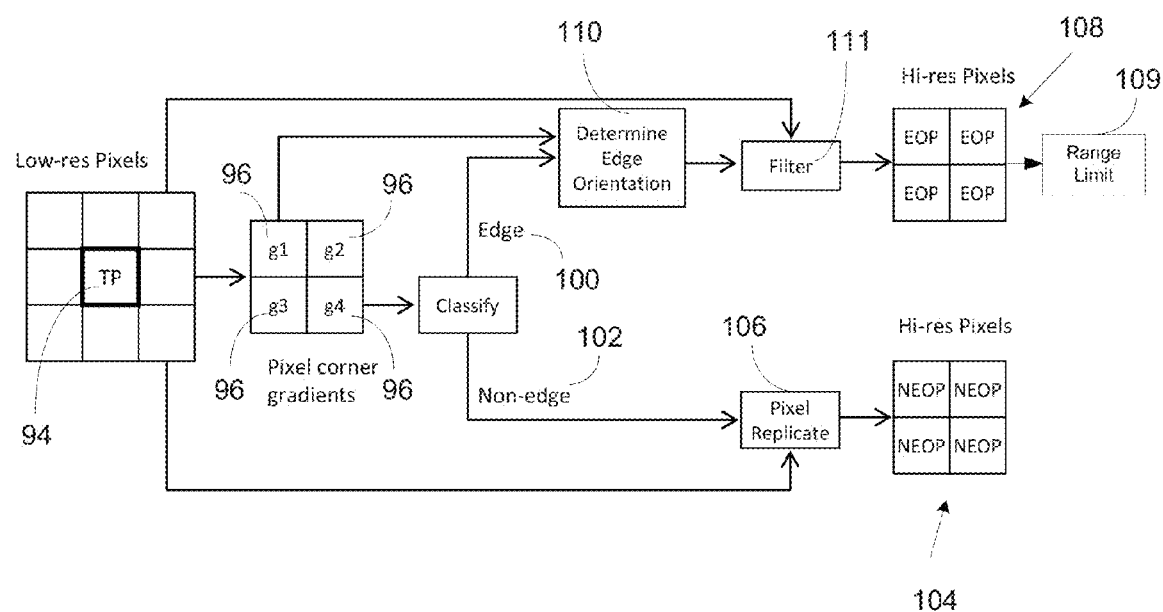
FIG. 9 depicts an example of pixel replacement according to an embodiment.
Figure 10:
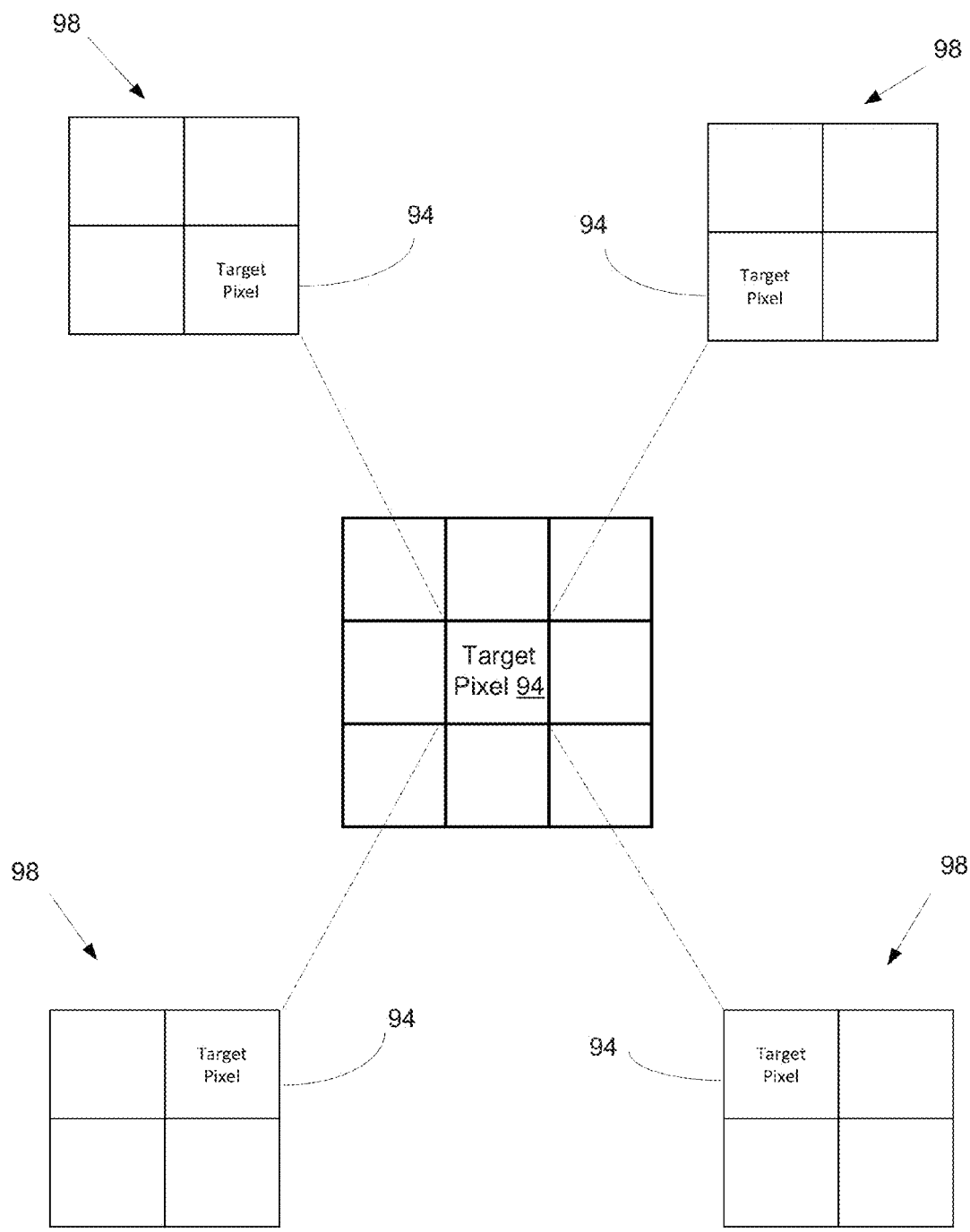
FIG. 10 depicts an example of using a 2×2 gradient operator to calculate corner gradients for a target pixel according to an embodiment.

The diagrams of FIGS. 9-15 are used to depict examples of pixel replacement to scale a digital representation of an image according to an embodiment. Testing has shown that enlarging a low resolution digital image by simple pixel replication often results in a "stair step" effect in which edges within the digital image are poorly rendered as sharp squares. FIG. 9 is a simplified diagram of an example of pixel replacement that provides high quality, high resolution digital images according to an embodiment. A plurality of target pixels are selected within a digital image. For each of the target pixels 94, corner gradients 96 are calculated at each of four corners of the target pixel 94 using a 2×2 gradient operator 98 (FIG. 10) to determine a corner gradient pattern. FIG. 10 illustrates the use of four 2×2 operators 98 to calculate corner gradients for target pixel 94, considering all of the neighbor pixels directly adjoining the target pixel 94.

Figure 11:
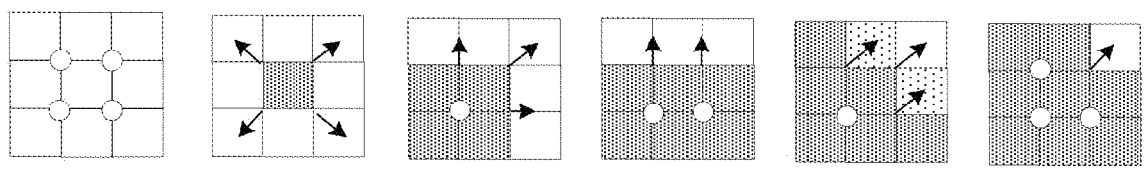
FIG. 11 depicts examples of non-edge gradient patterns at target pixel corners according to an embodiment.

Next, returning to FIG. 9, the corner gradient pattern may be compared to known gradient patterns for the features being analyzed to classify the target pixel 94 as an edge pixel 100 or a non-edge pixel 102. FIG. 11 depicts examples of known non-edge gradient patterns 112 at target pixel corners for non-edge features. Gradients are shown for the center target pixel with arrows, and pixel corners with a very low gradient magnitude are shown with an 'o' symbol. Returning to FIG. 9, the corner gradients 96 of each target pixel 94 in the digital image are compared to the known non-edge gradient patterns 112 (FIG. 11). In an embodiment, the corner gradients 96 may also be compared to any rotation or inversion of the known non-edge gradient patterns 112 (FIG. 11). If the gradients match the known non-edge gradient patterns 112 (FIG. 11) within a tolerance, the target pixel 94 is classified as a non-edge pixel 102 and replaced with a plurality of non-edge output pixels 104. In an embodiment simple pixel replication may be employed to replace the target pixel 94 with non-edge output pixels 104. In another embodiment, the non-edge output pixels 104 may be created by other means such as applying 3×3 non-directional smoothing or sharpening kernels.

Figure 12:
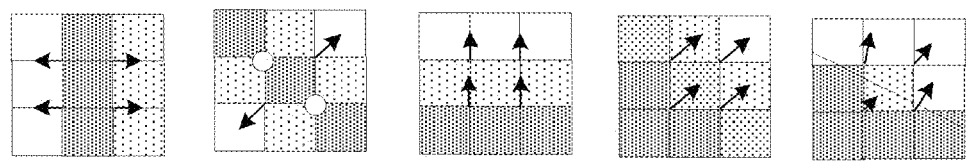
FIG. 12 depicts examples of edge gradient patterns at target pixel corners according to an embodiment.

Continuing with FIG. 9 and in an embodiment, the target pixel 94 may be deemed to be part of an edge, i.e., an edge pixel 100, if the corner gradients 96 do not align with the known gradient patterns at pixel corners for non-edge features 112 (FIG. 11). In another embodiment, the target pixel 94 may be deemed to be part of an edge, i.e., an edge pixel 100, if the corner gradients 96 align with known gradient patterns at pixel corners for edge features 114 (FIG. 12).

Figure 13A:
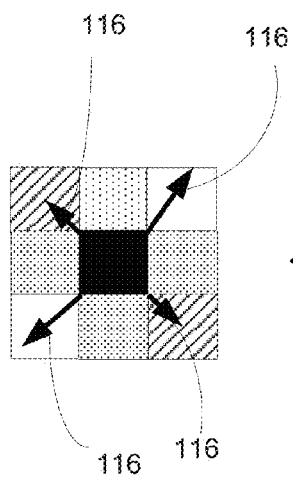
FIGS. 13A-13D depict an example edge orientation method according to an embodiment.
Figure 13B:
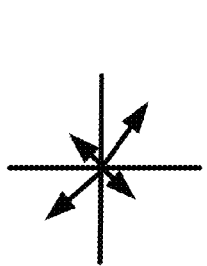
Figure 13C:
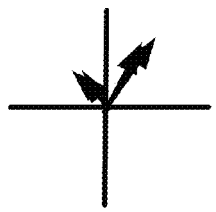
Figure 13D:
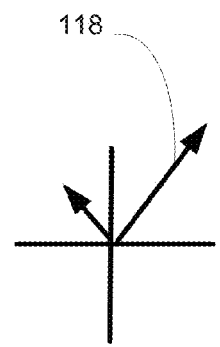

If the target pixel 94 is an edge pixel 100, the target pixel 94 is replaced with a plurality of edge output pixels 108. In an embodiment each target pixel 94 is replaced with four edge output pixels 108. To properly scale an edge by replacing the target pixel 94 with edge output pixels 108, an orientation of the edge 110 is determined. Determining an orientation of an edge may include reducing a plurality of corner gradients to a single aggregate gradient. In an embodiment, creating an aggregate gradient includes analyzing four corner gradients to create four vectors within a coordinate system with four quadrants, with each of the four vectors appearing in not more than one quadrant, projecting any vectors in a first quadrant to a second quadrant that is opposite the first quadrant, projecting any vectors in a third quadrant to a fourth quadrant that is opposite the third quadrant, summing second quadrant vectors to create a summed second quadrant vector, and summing fourth quadrant vectors to create a summed fourth quadrant vector, comparing magnitudes of the summed second quadrant vector and the summed fourth quadrant vector to determine a greatest magnitude vector, assigning the greatest magnitude vector as the aggregate gradient. FIGS. 13A-13D illustrate a particular embodiment of an edge orientation method. In FIG. 13A, gradient vectors 116 (indicated by arrows within the 3×3 matrix) at the pixel corners point in four different directions. FIG. 13B shows these gradient vectors 116 plotted in Cartesian coordinates. FIG. 13C shows the vector in quadrant 4 projected into quadrant 2, and the vector in quadrant 3 projected into quadrant 1. In FIG. 13D, the vectors in each quadrant are summed and the highest magnitude vector 118 indicates the aggregate gradient and is selected to determine edge orientation 110 (FIG. 9).

Figure 14:
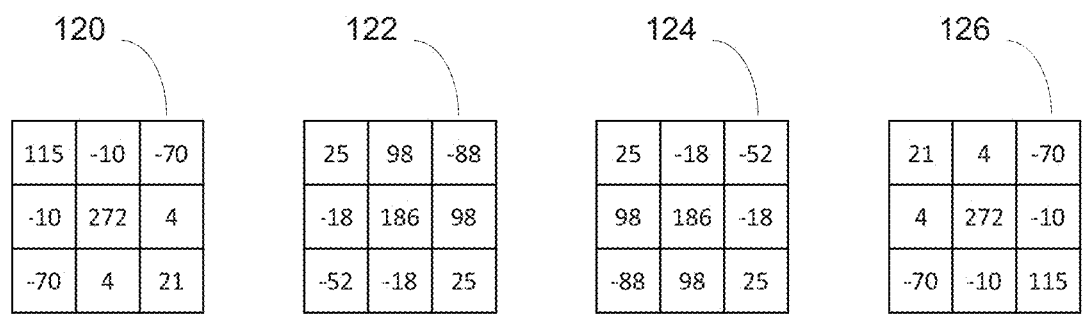
FIG. 14 depicts example filter kernels which may be applied to a target pixel to create high resolution edge output pixels according to an embodiment.

Returning to FIG. 9, based on the orientation of the edge a set of filter kernels are selected and applied to filter 111 and produce four replacement pixels for the ordinal pixel. Filter kernels may be of smoothing or sharpening varieties. Filter kernels may be designed for several angles ranging from zero degrees to forty-five degrees, with all other angles accounted for by geometric transforms of the filter kernels. FIG. 14 illustrates an example of four 3×3 filter kernels, designed for a forty-five degree edge, which may be applied to a 3×3 region surrounding the target pixel in an original image to create four new high resolution replacement pixels. The four different filter kernels in FIG. 14 each correspond to one of the four new replacement edge pixels. Referring FIG. 9 and FIG. 14, applying the first filter kernel 120 to the 3×3 region shown surrounding the target pixel 94 (FIG. 9) in the original image creates the upper left of the four edge output pixels 108 (FIG. 9). Applying the second filter kernel 122 to the 3×3 region shown surrounding the target pixel 94 (FIG. 9) in the original image creates the upper right of the four edge output pixels 108 (FIG. 9). Applying the third filter kernel 124 to the 3×3 region shown surrounding the target pixel 94 (FIG. 9) in the original image creates the lower left of the four edge output pixels 108 (FIG. 9). Applying the fourth filter kernel 126 to the 3×3 region shown surrounding the target pixel 94 (FIG. 9) in the original image creates the lower right of the four edge output pixels 108 (FIG. 9). In this embodiment four different filter kernels, each applied to the same original 3×3 image block surrounding the target pixel 94 (FIG. 9), replace the target pixel with four new double-resolution edge output pixels.

Figure 15:
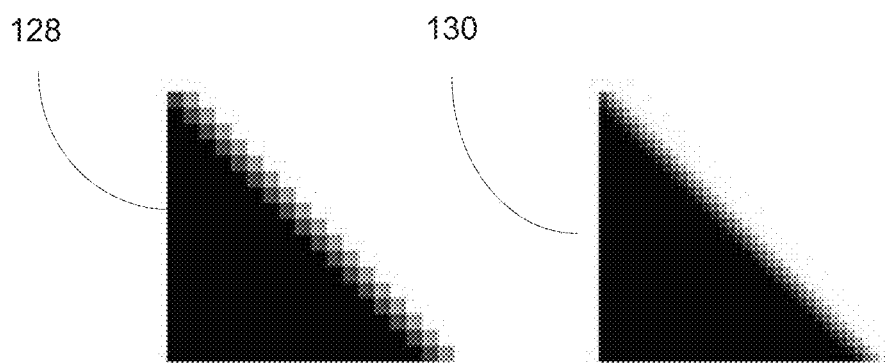
FIG. 15 is an example of an original edge and a result of applying pixel replacement according to an embodiment The same part numbers designate the same or similar parts throughout the figures.

FIG. 15 is a zoomed example of an original forty-five degree edge 128, and a result 130 of pixel replacement to scale a low resolution digital image according to an embodiment, including filtering 111 (FIG. 9) based upon edge orientation with the filter kernels of FIG. 14.

Returning to FIG. 9, in an embodiment as a final step each edge output pixel may be compared to the target pixel and three touching neighbor pixels in the original digital image to range limit 109 the edge output pixels. If an edge output pixel lies outside of the range of these comparison pixels, the output pixel's attribute value may be adjusted to fall within the range of the attribute values of the comparison pixels.

CONCLUSION

The diagrams of FIGS. 1-6 are used to depict example environments in which various embodiments may be implemented. Implementation, however, is not so limited. FIGS. 1-6 shows the architecture, functionality, and operation of various embodiments. Various components illustrated in FIGS. 2-6 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 7-8 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:
1. A method to scale a digital representation of an image, comprising:
  selecting a plurality of target pixels within a digital representation of an image; and
  for each of the target pixels,
    determining a corner gradient pattern;
    analyzing the corner gradient pattern to classify the target pixel as an edge pixel or a non-edge pixel;
      if the target pixel is a non-edge pixel, replacing the target pixel with a plurality of non-edge output pixels;
      if the target pixel is an edge pixel, replacing the target pixel with a first plurality of edge output pixels, comprising
        determining an orientation of an edge, and selecting, based on the orientation, and applying a filter kernel to produce the edge output pixels to replace the target pixel, wherein determining an orientation of an edge comprises one of:

applying a first rule that gradients on opposite sides of the target pixel pointing in approximately a common direction identify the target pixel as a member of an edge perpendicular to the common direction;

applying a second rule that the gradients on the opposite sides of the target pixel pointing in approximately opposite directions identify the target pixel as a member of a fine line.

2. The method of claim 1, wherein determining a corner gradient pattern comprises calculating four corner gradients, one at each of four corners of the target pixel.

3. The method of claim 2, wherein calculating the four corner gradients comprises using a 2×2 gradient operator.

4. The method of claim 1, wherein analyzing the corner gradient pattern comprises comparing the target pixel's corner gradient pattern to a plurality of known gradient patterns.

5. The method of claim 1, wherein the plurality of non-edge output pixels comprises exactly four non-edge output pixels.

6. The method of claim 1, wherein the plurality of edge output pixels comprises exactly four edge output pixels.

7. The method of claim 1, wherein determining an orientation of an edge comprises reducing a plurality of corner gradients to an aggregate gradient.

8. The method of claim 1, wherein applying a filter kernel comprises applying a 3×3 filter kernel to produce the edge output pixels to replace the target pixel.

9. The method of claim 1, wherein applying a filter kernel comprises selecting four 3×3 filter kernels to produce four edge output pixels to replace the target pixel.

10. The method of claim 1, further comprising range limiting a second plurality of edge output pixels, comprising, for each of the second plurality of edge output pixels, comparing the edge output pixel to the target pixel and a plurality of neighbor pixels, and if a value of the edge output pixel lies outside a range value of the target pixel and the neighbor pixels, the value of the edge output pixel is set to the range value.

11. A system to scale a digital representation of an image, comprising:

hardware, including a processor;

a non-transitory computer-readable data storage medium storing a computer program executable by the processor to implement an analysis engine and a scaling engine, the analysis engine configured to select a plurality of target pixels within a digital representation of an image, and, for each of the target pixels, determine a corner gradient pattern, and analyze the corner gradient pattern to classify the target pixel as an edge pixel or a non-edge pixel; and the scaling engine configured to if the target pixel is a non-edge pixel, replace the target pixel with a plurality of non-edge output pixels; and if the target pixel is an edge pixel, replace the target pixel with a first plurality of edge output pixels, comprising determining an orientation of an edge, and selecting, based on the orientation, and applying a filter kernel to produce the edge output pixels to replace the target pixel, wherein the scaling engine is additionally configured to range limit a second plurality of edge output pixels comprising, for each of the second plurality of edge output pixels, comparing the edge output pixel to the target pixel and a plurality of neighbor pixels, and if a value of the edge output pixel lies outside a range value of the target pixel and the neighbor pixels, the value of the edge output pixel is set to the range value.

12. The system of claim 11, wherein determining a corner gradient pattern comprises calculating four corner gradients, one at each of four corners of the target pixel.

13. The system of claim 12, wherein determining an orientation of an edge comprises reducing the four corner gradients to an aggregate gradient, comprising:

analyzing the four corner gradients to create four vectors within a coordinate system with four quadrants;

projecting any vectors in a first quadrant to an opposite facing second quadrant;

projecting any vectors in a third quadrant to an opposite facing fourth quadrant;

summing second quadrant vectors to create a summed second quadrant vector;

summing fourth quadrant vectors to create a summed fourth quadrant vector;

comparing magnitudes of the summed second quadrant vector and the summed fourth quadrant vector to determine a greatest magnitude vector; and assigning the greatest magnitude vector as the aggregate gradient.

14. The system of claim 11, wherein applying a filter kernel comprises applying a 3×3 filter kernels to produce the edge output pixels to replace the target pixel.

15. The system of claim 11, wherein applying a filter kernel comprises selecting four 3×3 filter kernels to produce four edge output pixels to replace the target pixel.

16. A method to scale a digital representation of an image, comprising:

selecting a plurality of target pixels within a digital representation of an image; and for each of the target pixels, determining a corner gradient pattern;

analyzing the corner gradient pattern to classify the target pixel as an edge pixel or a non-edge pixel;

if the target pixel is a non-edge pixel, replacing the target pixel with a plurality of non-edge output pixels;

if the target pixel is an edge pixel, replacing the target pixel with a first plurality of edge output pixels, comprising determining an orientation of an edge, and selecting, based on the orientation, and applying a filter kernel to produce the edge output pixels to replace the target pixel, wherein determining a corner gradient pattern comprises calculating four corner gradients, one at each of four corners of the target pixel, and wherein determining an orientation of an edge comprises reducing the four corner gradients to an aggregate gradient, comprising analyzing the four corner gradients to create vectors within a four quadrant coordinate system, with each of the vectors appearing in not more than one quadrant;

projecting any vectors in a first quadrant to an opposite facing second quadrant;

projecting any vectors in a third quadrant to an opposite facing fourth quadrant;

summing second quadrant vectors to create a summed second quadrant vector;

summing fourth quadrant vectors to create a summed fourth quadrant vector;

comparing magnitudes of the summed second quadrant vector and the summed fourth quadrant vector to determine a greatest magnitude vector; and assigning the greatest magnitude vector as the aggregate gradient.

* * * * *